United States Patent [19]
Yazejian

[11] Patent Number: 5,738,378
[45] Date of Patent: Apr. 14, 1998

[54] SAFETY VEHICLE

[76] Inventor: Raymond V. Yazejian, 1085 Dorchester, Bloomfield Hills, Mich. 48302

[21] Appl. No.: 625,097

[22] Filed: Apr. 1, 1996

[51] Int. Cl.⁶ .................................................. B62D 21/15
[52] U.S. Cl. ........................... 280/784; 180/232; 296/35.2
[58] Field of Search .......................... 280/784; 180/274, 180/232; 296/35.1, 35.2

[56] References Cited

U.S. PATENT DOCUMENTS

| | | |
|---|---|---|
| 2,896,735 | 7/1959 | Bohn . |
| 2,929,637 | 3/1960 | Papacosta . |
| 3,162,479 | 12/1964 | Hewitt . |
| 3,479,080 | 11/1969 | Hilfiker . |
| 3,589,466 | 6/1971 | Dudley ............................ 180/82 |
| 3,743,347 | 7/1973 | Shaw ............................ 296/35.2 |
| 3,806,184 | 4/1974 | Dean ............................ 296/35 R |
| 3,837,422 | 9/1974 | Schlanger ............................ 180/274 |
| 3,869,016 | 3/1975 | Astheimer ............................ 180/73 R |
| 3,869,017 | 3/1975 | Feustel et al. ............................ 180/82 R |
| 3,904,237 | 9/1975 | Barenyi ............................ 296/28 F |
| 3,955,640 | 5/1976 | Yamanaka ............................ 180/91 |
| 3,971,588 | 7/1976 | Bauer ............................ 280/784 |
| 3,981,530 | 9/1976 | Yamanaka et al. ............................ 296/35 R |
| 4,054,314 | 10/1977 | Yamanaka ............................ 296/35 R |
| 4,065,169 | 12/1977 | Yamanaka ............................ 293/35 R |
| 4,078,636 | 3/1978 | Yamanaka ............................ 188/1 C |
| 4,293,052 | 10/1981 | Daswick et al. ............................ 180/219 |
| 4,365,825 | 12/1982 | Merkle ............................ 280/777 |
| 4,826,209 | 5/1989 | Farris ............................ 280/784 |
| 5,409,262 | 4/1995 | McLennan ............................ 280/784 |
| 5,451,077 | 9/1995 | Fantauzzo ............................ 280/74 |

FOREIGN PATENT DOCUMENTS

| | | | |
|---|---|---|---|
| 705020 | 5/1931 | France | ............................ 180/274 |
| 228373 | 11/1974 | France | ............................ 180/232 |

*Primary Examiner*—Paul N. Dickson
*Attorney, Agent, or Firm*—Harness, Dickey & Pierce, P.L.C.

[57] ABSTRACT

A safety vehicle is provided for absorbing energy during a front impact or collision and utilizes excess energy from the impact to upwardly displace a forward portion of an occupant compartment of the vehicle. In one embodiment, the safety vehicle includes a chassis having a two-part construction, including a front chassis member and a rear chassis member. The front chassis member is fixedly interconnected to the rear chassis member with securing elements preferably in the form of shear bolts or exploding bolts. Upon a vehicle collision at a predetermined speed, the shear bolts are intended to fail and thereby permit the rear chassis member to translate forwardly relative to the front chassis member. The rear chassis member is preferably formed to include a longitudinally extending series of alternating webs and slots. As the rear chassis member is translated forwardly relative to the front chassis member, a portion of the front chassis member extends through the slots and operates to shear the webs between the slots, thereby absorbing energy of the impact slowly and finally arresting the translation of the rear chassis member.

16 Claims, 5 Drawing Sheets

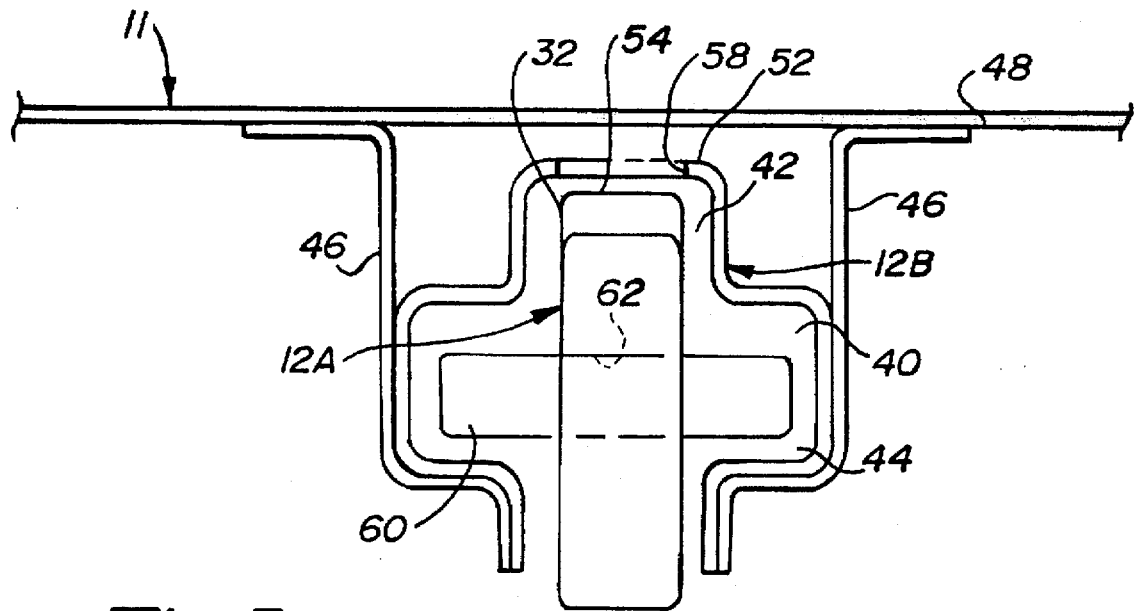
_Fig-3_
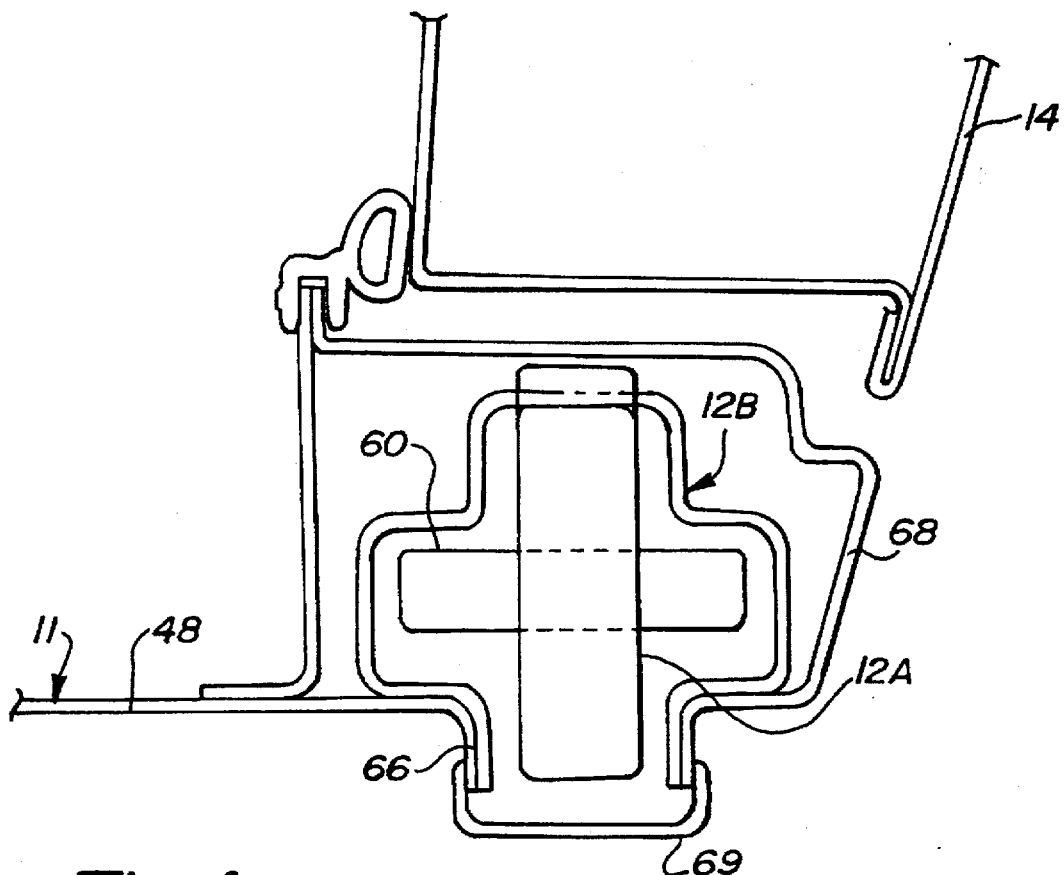
_Fig-4_

SAFETY VEHICLE

BACKGROUND OF THE INVENTION

1. Field of the Invention

The present invention generally relates to motor vehicles. More particularly, the present invention relates to an improved vehicle design which significantly reduces the possibility of severe injury or death by minimizing the transfer of deceleration forces to a vehicle occupant during a collision or impact through the absorption of energy and effective lengthening of the time within which motion of the vehicle occupant is arrested. The vehicle design of the present invention is also operative to divert the passenger compartment from the path of the vehicle's engine during a frontal collision.

2. Description of the Prior Art

Modernly, manufacturers and consumers alike have placed a heightened significance upon safety features for automotive vehicles. Almost exclusively, such safety features have been directed to devices for absorbing impact such as padded dashboards, collapsible steering columns, seat belts, inflatable airbags, controlled-crush front ends, and the like. Particularly where collisions take place at reduced speeds, impact absorbing safety features, including those discussed above, have proven generally acceptable for satisfactorily reducing the potential for injury. However, in instances of vehicle collisions or impacts involving higher speeds, known safety features are generally inadequate to prevent serious injury or death.

In motor vehicle collisions, the vehicle is subject to a rate of deceleration. The particular rate of deceleration depends upon the vehicle's initial rate of speed and the time over which the speed of the vehicle is reduced. Deceleration forces not absorbed by the vehicle are transferred to the vehicle occupant until motion of the vehicle occupant is arrested relative to the vehicle. Such motion is generally arrested by safety belts, air bags, or other interior vehicle structure.

Through testing with anthropomorphic test devices (more commonly known as ATD's or test dummies), it has been determined that collisions occur in less than 125 milliseconds. Injuries or death resulting from high speed vehicle collisions are frequently attributable not only to vehicle occupant impact with interior vehicle structure, but is also attributable to the magnitude of deceleration forces. Thus, even if it were possible to completely restrain a vehicle occupant with safety devices such as seat belts and airbags, the possibility of occupant injury is not eliminated. This becomes increasingly true with higher speed impacts.

The following equation governs the rate of deceleration:

$$a = \frac{v_i - v_f}{t}$$

where a=deceleration rate, $v_i$=initial velocity, $v_f$=final velocity, and t=time. Assuming that motion is completely arrested (i.e., the final velocity is zero), the equation can be simplified to the following:

$$a = \frac{v_i}{t}$$

Under uniform deceleration, the rate of deceleration is also defined as follows:

$$a = 2x/t^2$$

where x=distance, a=rate of deceleration and t=time. Hence, the rate of deceleration appreciated by a body and the resultant deceleration forces can be minimized by maximizing the time the body is brought to rest or maximizing the distance within which motion is arrested.

With high speed collisions or impacts, a direct correlation exists between the degree of resulting injuries and deceleration forces transferred to the passengers. In other words, deceleration forces and injury are functions of negative acceleration. At 60 miles per hour or 88 feet per second, motion of a vehicle that collides with an immovable object is typically arrested within a distance of three feet or less. This equates with an elapsed time of 34 milliseconds.

As noted in U.S. Pat. No. 4,826,209 to Farris, two automobiles each traveling at 30 miles per hour in a barrier collision would approximate the same speed of a 60 mile per hour collision resulting in a force in the range of approximately 240 or more times than the negative rate of acceleration due to gravity, or 240 or more "G's". If the time involved in the above described collision could be doubled, which translates into an additional three feet of "stopping" space, the "G" forces are found to be divisible by four, equalling 60 "G's". If this time is tripled, or equivalent to nine feet, the "G" forces are divided by nine, equalling 26.66 "G's". Therefore, the increased stopping distance or time involved during a collision is critical to injuries sustained by an occupant of a vehicle.

Extensive testing has determined that the passengers in the front seat of a vehicle will decelerate to zero within approximately four to seven feet or approximately 45 to 79 milliseconds and the passengers in the rear seat have approximately an additional three feet of travel for approximately 79 to 113 milliseconds before impact. Survivability can be equated with "G" forces. Animal and human experimentation has demonstrated that deceleration in the range of approximately 40 "G's" can be at least momentarily sustained. Therefore, it is apparent that an increase in the time or distance within which the motion of a vehicle occupant is arrested (i.e., the rate of deceleration) is all important to survivability and/or injury to vehicle occupants.

Heretofore, various attempts have been made in an effort to minimize the potentially injurious deceleration forces that result from high speed impacts. For example, in the above-noted U.S. Pat. No. 4,826,209 to Farris, disclosed is a vehicle collision safety system including a chassis having a plurality of lever arms which effectively collapse a portion of the chassis during a frontal impact. More particularly, upon impact, a front portion of the chassis rotates about a first pivot point in a first direction of rotation and a chassis rear portion rotates about a second pivot point in a second direction of rotation opposite to the first direction of rotation of the chassis front portion. As a result, the passenger section of the vehicle body is displaced from the linear impact forces created by the collision and a portion of the linear deceleration motion of the vehicle is translated into rotational motion of the passenger section of the vehicle body.

Another arrangement is shown in U.S. Pat. No. 3,162,479 to Hewitt which is directed to an automobile construction for "safely decelerating passengers upon high speed impact", including a passenger compartment releasably secured to a chassis. The passenger compartment is secured to tracks and is adapted to be released from its normal operating position during a high speed impact. The tracks are upwardly curved at their forward ends so that forward movement of the passenger compartment causes upward displacement of a forward end thereof. A pair of energy absorbing devices in the form of pneumatic cylinders interconnect the passenger compartment with the remainder of the vehicle and function to dissipate energy.

Other known arrangements for displacing a passenger compartment relative to the remainder of the vehicle are shown in the following U.S. Pat. Nos.: 2,929,637 to Papacosta; 3,479,080 to Hilfiker; 3,589,466 to Dudley; and 3,806,184 to Dean.

Prior known arrangements for absorbing deceleration forces resulting from high speed collisions include the following U.S. Pat. Nos.: 3,904,237 to Barenyl; 4,078,636 to Yamanaka; 4,293,052 to Daswich, et al.; 4,365,825 to Merkle; 5,409,262 to McLennan; and 5,451,077 to Fantauzzo.

While prior known arrangements, including but not limited to those discussed above, have proven to be commercially acceptable for a wide range of applications, each is attendant with its drawbacks and inherent limitations. For example, some prior known arrangements are complicated in construction. Other known arrangements are unable to absorb deceleration forces and displace the vehicle occupant in instances of high speed, head-on collision. Other prior known arrangements are associated with substantially increased manufacturing costs.

Thus, there remains a need in the art for a safety vehicle which serves to minimize the transfer of injurious deceleration forces to a vehicle occupant during a collision or impact by absorbing energy and effectively lengthening the time/distance within which motion of the vehicle occupant is arrested in a cost effective manner.

It is a principal object of the present invention to provide a safety vehicle which absorbs impact energy through shearing action and utilizes the excess energy to vertically displace the occupant compartment to avoid engine intrusion into the passenger compartment.

It is a related object of the present invention to provide a safety vehicle which minimizes the amount of kinetic energy necessary to arrest motion of a vehicle occupant during an impact and thereby correspondingly minimize the potential for occupant injury or death.

SUMMARY OF THE INVENTION

This invention is directed to a method and apparatus which overcome the drawbacks of prior known devices, including those discussed above. In one preferred form, fie apparatus of the present invention comprises a safety arrangement for an automotive vehicle of the type including a chassis and a body having a forward portion and a passenger compartment. The safety arrangement includes a rear chassis member and forward chassis member. The rear chassis member is fixedly attached to the passenger compartment and the forward chassis member is fixedly attached to the forward portion of the body. The forward chassis member is slidingly engaged with the rear chassis member.

The safety arrangement further includes a plurality of securing elements interconnecting the forward chassis member and the rear chassis member. In one application, the securing elements are shear bolts or exploding bolts. The securing elements are adapted to fixedly retain the forward chassis member relative to the rear chassis member under normal operating conditions of the automotive vehicle and further adapted to fail under a predetermined load so as to permit the rear chassis member to slide rearwardly and upwardly relative to the forward chassis member.

In a second preferred form, the apparatus of the present invention comprises an automotive vehicle including a body having a passenger compartment and a forward portion. The automotive vehicle further includes a chassis having a rear chassis member and a forward chassis member. The rear chassis member is fixedly attached to the passenger compartment. The forward chassis member is fixedly attached to the forward portion of the body. The forward chassis member is slidingly engaged with the rear chassis member. An engine is fixedly attached to the forward chassis.

The automotive vehicle further comprises a plurality of securing elements interconnecting the forward chassis member and the rear chassis member. Preferably, the securing elements are shear bolts, exploding bolts, or other mechanical connection intended to fail under a predetermined load. The securing elements are adapted to fixedly retain the forward chassis member relative to the rear chassis member under normal operating conditions of the automotive vehicle and further adapted to fail under a predetermined load so as to permit the forward chassis member to slide rearwardly relative to the rear chassis member.

In a third preferred form, the apparatus of the present invention comprises an automotive vehicle for absorbing deceleration forces generated from high speed head-on collisions or impacts and for upwardly displacing a vehicle occupant. The automotive vehicle includes a chassis and a body having a forward portion and a passenger compartment. The chassis includes a rear chassis member and a forward chassis member. The forward chassis member is fixedly attached to the forward portion of the body and the rear chassis member is fixedly attached to the passenger compartment. The forward chassis member is slidingly engaged with the rear chassis member.

The automotive vehicle further includes a plurality of securing elements interconnecting the forward chassis member and the rear chassis member. The plurality of securing elements are adapted to fixedly retain the forward chassis member relative to the rear chassis member under normal operating conditions of the automotive vehicle and are further adapted to fail under a predetermined load so as to permit the rear chassis member to slide forward relative to the forward chassis member.

The automotive vehicle further includes a shearable section carried by one of the forward chassis member and the rear chassis member and a shearing portion carried by the other of the forward chassis member and the rear chassis member.

During a high speed head-on collision or impact involving the safety vehicle of the present invention, the distance within which the motion of an occupant is arrested relative to the vehicle body is increased, thereby decreasing the magnitude of the potentially injurious deceleration forces transferred from the vehicle body to the occupant.

BRIEF DESCRIPTION OF THE DRAWINGS

Further objects, features and advantages of the present invention will become apparent from analysis of the following written specification and accompanying drawings and the appended claims in which:

FIG. 3 is a cross-sectional view taken along the line 3—3 illustrating the rear chassis member mounted to an underside of the floor of the vehicle body before the rear chassis member is forwardly translated relative to the forward chassis member;

FIG. 4 is a cross sectional view similar to FIG. 3, alternatively illustrating an alternative arrangement for mounting of the rear chassis member relative to the vehicle body, illustrated after the rear chassis member has been forwardly translated relative to the forward chassis member;

DETAILED DESCRIPTION OF THE PREFERRED EMBODIMENTS

Figure 1:
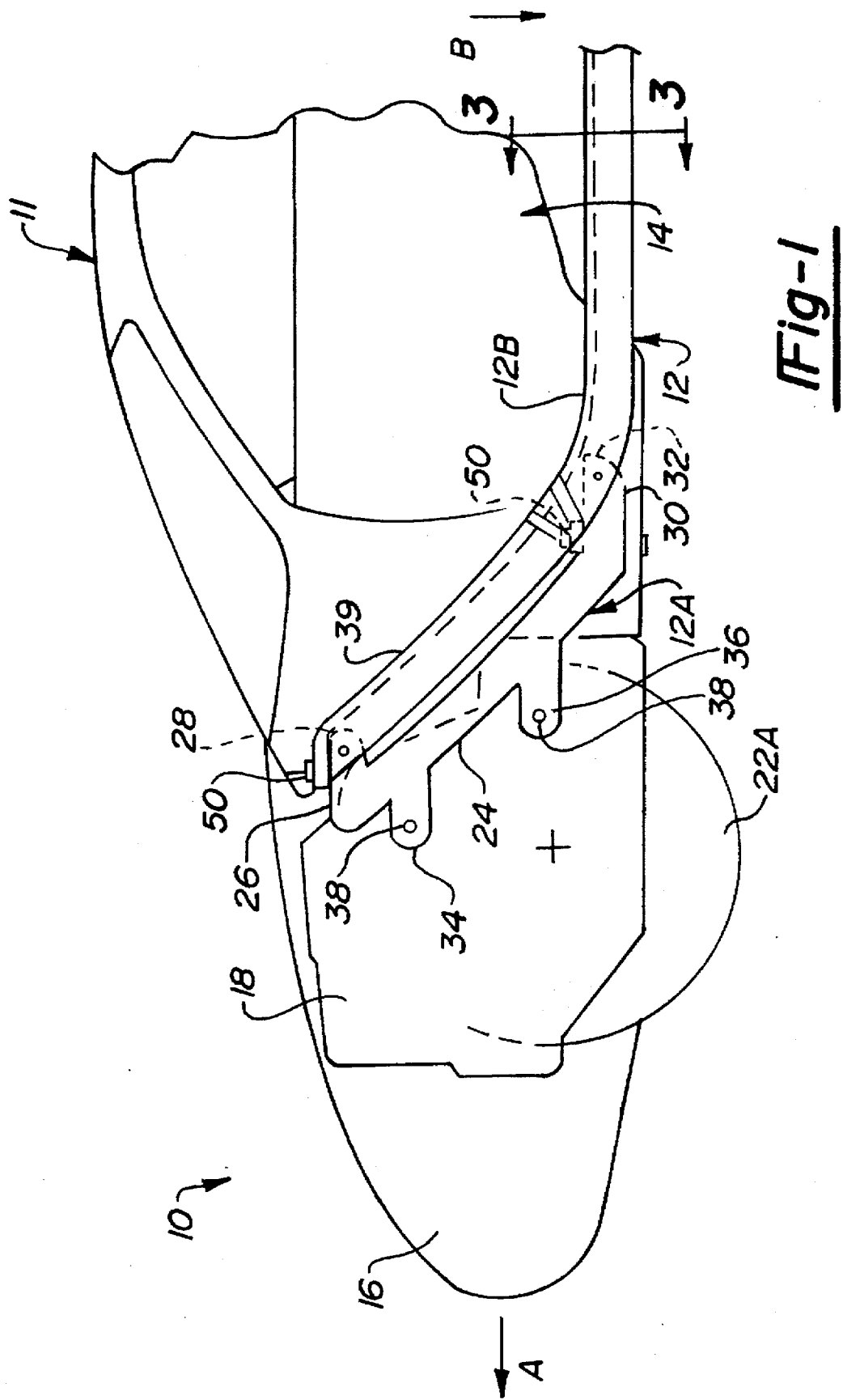
FIG. 1 is a partial side view of a safety vehicle incorporating the teachings of the first preferred embodiment of the present invention.

As required, detailed embodiments of the present invention are disclosed herein. However, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Turning generally to FIGS. 1 through 5 of the drawings in which identical or equivalent elements have been denoted with like reference numerals, a first preferred embodiment of a safety vehicle constructed in accordance with the teachings of the present invention is illustrated. With specific reference to FIG. 1, the safety vehicle has been generally identified with reference numeral 10. Although only one side (i.e., the driver's side) of the safety vehicle 10 has been illustrated in FIGS. 1-5 for purposes of describing the subject invention, it will be understood by those skilled in the art that the opposite side (i.e., the passenger's side) of the safety vehicle 10 is similarly constructed to be a substantial mirror image.

The illustrative embodiment of the safety vehicle 10 generally includes a body 11 mounted on a chassis partially illustrated at 12. The body 11 of the safety vehicle includes a section defining a passenger compartment or capsule 14 which is secured to the chassis 12 and a forward portion 16 which defines an engine compartment housing an engine 18. The passenger compartment and the forward portion 16 of the vehicle body 11 are separated by a firewall 20. While not disclosed in detail, it will be appreciated by those skilled in the art that the chassis 12 is supported by front and rear pairs of wheels which rotate on axles, respectively. One wheel from each of the front and rear pairs of wheels has been designed with the reference numeral 22a and 22b, respectively. It will be further understood that the interconnection between the chassis 12 and the pair of wheels can be of any manner well known in the art.

As will become more apparent below, when a high speed collision occurs, the passenger compartment 14 breaks away from its fixed position relative to the forward portion 16 of the vehicle body 11 and is allowed to be displaced forwardly and upwardly relative to the forward portion 16 of the vehicle body 11 even though the velocity of the forward portion 16 of the chassis 12 has been almost instantaneously reduced to zero. The safety vehicle 10 operates by virtue of movement of the passenger compartment 14 relative to the front chassis member 16 to absorb the kinetic energy of the passenger compartment 14 and accomplish deceleration of the vehicle occupants (not shown) within the compartment 14 at a substantially decreased rate. As a result, the forces to which the passengers are subjected as a result of the impact are significantly reduced, thereby reducing or eliminating the potential for serious or fatal injuries.

With specific reference to FIG. 1, the chassis 12 of the safety vehicle 10 of the preferred embodiment of the present invention is shown to generally a two-part construction. For purposes of discussion herein, the chassis 12 includes a front and a rear portion. The portion of the chassis 12 is attached to the forward portion 16 of the vehicle body 11 will be referred to as the forward chassis member and is identified in the drawings with the reference numeral 12a. The rear portion of chassis 12 which is attached to the passenger compartment will be referred to as the rear chassis member and is identified in the drawings with the reference numeral 12b.

Figure 5:
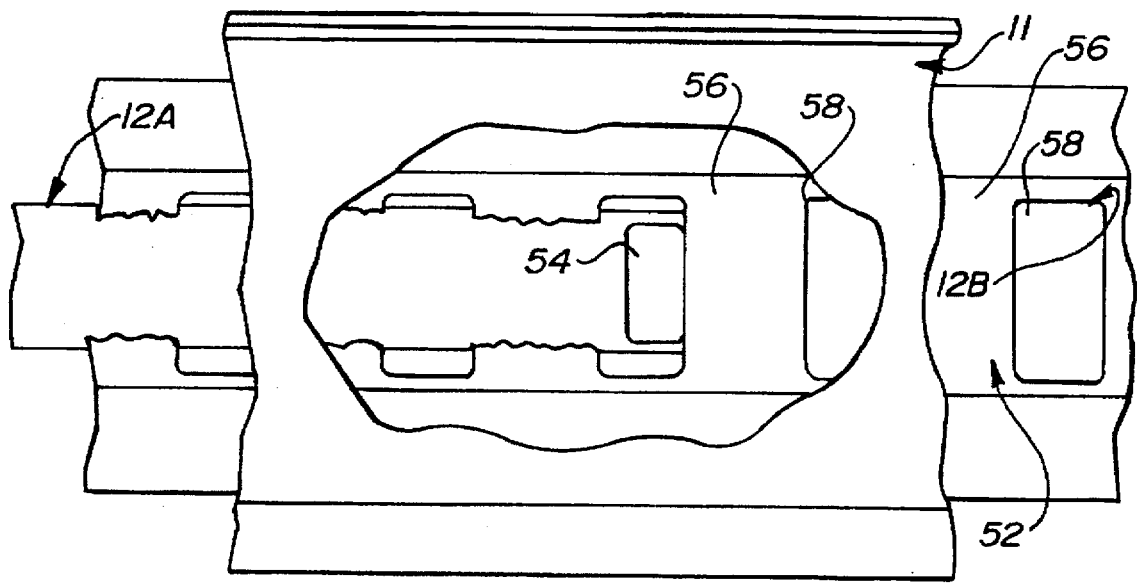
FIG. 5 is a partially cutaway plan view taken in the direction of arrow B in FIG. 1.

With particular reference to FIG. 1, 3 and 5, the forward chassis member of the chassis 12 is illustrated to comprise an elongated beam 24 having an axis disposed at an angle of approximately 45° with respect to a horizontal plane. However, it will be appreciated by those skilled in the art, that any particular angle is within the scope of the present invention. At a first end or upper end 26, the elongated beam is integrally formed with a rearwardly extending first engagement portion 28. Similarly, a second end 30 of the elongated beam 24 is formed to include a rearwardly extending second engagement portion 32. The construction and operation of the first and second engaging portions will be discussed more fully below. The beam 24 further includes first and second forwardly extending mounting portions 34 and 36 which are fixedly interconnected to the engine 18 with threaded fasteners or other suitable means well known in the art. While not shown, the mounting portions 34 and 36 may be interconnected to the engine 18 through engine supports.

The rear chassis member 12b includes a forward section 39 which angles upwardly as it extends forwardly. As shown in FIG. 1, the forward section 39 is arranged substantially parallel with the beam 24 of the front chassis member 12a.

With specific reference to the cross-sectional view of FIG. 3, the rear chassis member 12b is shown to be hollow and define a guide cavity 40. In the exemplary embodiment illustrated, the guide cavity 40 defined by the rear chassis member 12b includes four pockets arranged in pairs. Opposing pockets define a first channel portion 42 oriented in a vertical plane and a second channel portion 44 oriented in a horizontal plane. In the arrangement shown in FIG. 3, the rear chassis member 12b is fixedly interconnected to the body 11 of the vehicle 10 with a pair of brackets 46. In this regard, the brackets are welded or otherwise suitably attached to the rear chassis member and in turn welded or suitably attached to the floor 48 of the body 11.

The front and rear portions of the chassis 12 are joined by securing elements 50. In the embodiment illustrated throughout the drawings, the securing elements are preferably shear bolts or exploding bolts 50 of appropriate design. The shear bolts 50 are oriented substantially perpendicular to the direction of vehicle travel which is indicated in FIG. 1 with the reference letter A. As illustrated, two shear bolts 50 are utilized. However, it will be appreciated by those skilled in the art that any number of shear bolts 50 or other securing elements may be utilized to interconnect the front chassis member 12a and the rear chassis member 12b.

The shear bolts 50 are adapted to fixedly retain the front chassis member 12a relative to the rear chassis member 12b under normal operating conditions of the automotive vehicle and low speed collisions or impacts. The shear bolts 50 are further adapted to fail under a predetermined load so as to permit the front chassis member 12a to translate rearwardly relative to the rear chassis member 12b. In one application, the shear bolts are adapted to fail under loads generated in a collision involving the safety vehicle 10 and a stationary object at vehicle speeds of approximately 30 miles per hour or greater or equivalent collisions or impacts. This speed generally corresponds to complete crush of the front end on the vehicle. Suitable shear bolts 50 are commercially available from various sources.

With reference to FIGS. 3 and 5, the interrelationship between the front chassis member 12a and rear chassis member 12b will now be described. In the preferred embodiment, one of the front chassis member 12a and the rear chassis member 12b is formed to include a shearable section 52 carried thereby. The other of the front chassis member 12a and rear chassis member 12b is formed to include a shearing portion 54 carried thereby. Further preferably, the shearable section 52 is carried by the rear chassis member 12b and the shearing portion 54 is carried by the front chassis member 12a. In the exemplary embodiment illustrated, the shearable portion comprises a first side or upper side 52 of the rear chassis member 12b. The first side is formed to include a longitudinally extending series of alternating webs 56 and slots 58. In the preferred embodiment, the alternating webs 56 and slots 58 are only located on the horizontal lower portion of the rear chassis member 12b. Alternatively, the webs 56 and slots 58 may be formed on the remainder of the rear chassis member 12b.

As shown in FIG. 3, the second engagement portion 32 includes a generally rectangular cross section and is disposed within the first channel portion 42 of the guide cavity 40. An upper end (shearing portion 54) is adapted to extend beyond the first side 52 of the rear chassis member 12b and through the slots 58 as the front chassis member 12a is moved rearwardly relative to the rear chassis member 12b.

With reference to FIG. 4, an alternate mounting arrangement of the rear chassis member 12b to the vehicle body 11 is shown. In this alternative construction, the present invention is embodied in a sill installed version. More particularly, the rear chassis member 12a is welded or otherwise suitably attached to a downwardly extending portion 66 of the floor 48 of the vehicle body 11. As illustrated, the vehicle body 11 also includes a sill portion 68 which is also welded or otherwise suitably attached to the rear chassis member 12b. The alternate mounting structure of FIG. 4 also incorporates a cap member 69 which interconnects the laterally opposing sides of the rear chassis member 12b. In the embodiment illustrated, the cap member 69 is welded or otherwise suitable fastened to the downwardly extending portion 66 of the floor 48 and the sill portion 68. The cap member 69 serves to further rigidify the rear chassis member 12b to ensure that the cross pin 60 is retained within the rear chassis member 12b as the rear chassis member 12b is translated forwardly relative to the front chassis member 12a. While not specifically illustrated, it will be appreciated by those skilled in the art that certain applications may incorporate an alternating web and slot arrangement longitudinally along the cap member 69 to absorb further energy from impacts or collisions. The web and slot arrangement would be substantially identical to that described above with respect to the first preferred embodiment of the present invention, the webs being adapted to be sheared by a lower end of the forward extending portion 32. Alternatively, for even more energy absorbing capacity, the cap member 69 may be formed without such a slot and web arrangement, but still oriented relative to the forward extending member 32 such that the cap member 69 is sheared (e.g. in a can opener type fashion) as the rear chassis member 12b is moved forward relative to the forward chassis portion 12a. The degree of energy absorbing capacity incorporated into the safety vehicle of any of the preferred embodiments of the present invention will depend to a large extend on factors such as total vehicle weight and the amount of energy absorbed by crush of the front end.

The remaining construction of the sill installed version illustrated in FIG. 4 is identical to the underfloor mounted version previously described with respect to FIGS. 1–3 and 5. Thus, common reference numerals have been used in FIG. 4 to identify elements substantially identical to corresponding elements of the underfloor installed versions. It will be understood that the variations described with respect to FIG. 4 can be similarly incorporated into other arrangements, including but not limited to those shown throughout the remaining drawings.

With particular reference to FIGS. 1 and 3, the safety vehicle 10 of the present invention is further shown to include a pair of retaining members 60 for retaining the front chassis member 12a telescopically within the rear chassis member 12b as the front chassis member 12a is moved rearwardly relative to the rear chassis member 12b during a front impact or collision. In the preferred embodiment, the retaining members comprise cross pins 60 which pass through apertures 62 in the first and second engagement portions 28 and 30. The cross pins 60 are arranged so as to be disposed within the second channel portion 44 of the guide cavity 40.

With specific reference to the sequential views of FIGS. 2A through 2C, the operation of the safety vehicle 10 during a collision or impact will now be described. The safety vehicle 10 is constructed to generally appear to be of conventional construction. Ordinary bumps or collisions at speeds where seat belts, airbags, impact absorbing front end designs, or other safety features of conventional vehicles give adequate protection do not release the passenger compartment from its fixed position relative to the chassis. However, in the event of a collision at high speed where the protection afforded by seat belts, airbags and other known safety devices is generally inadequate, the securing elements 50 release the passenger compartment 14, thereby allowing it to travel in a path in the direction of movement of the vehicle and upwardly.

Figure 2A:
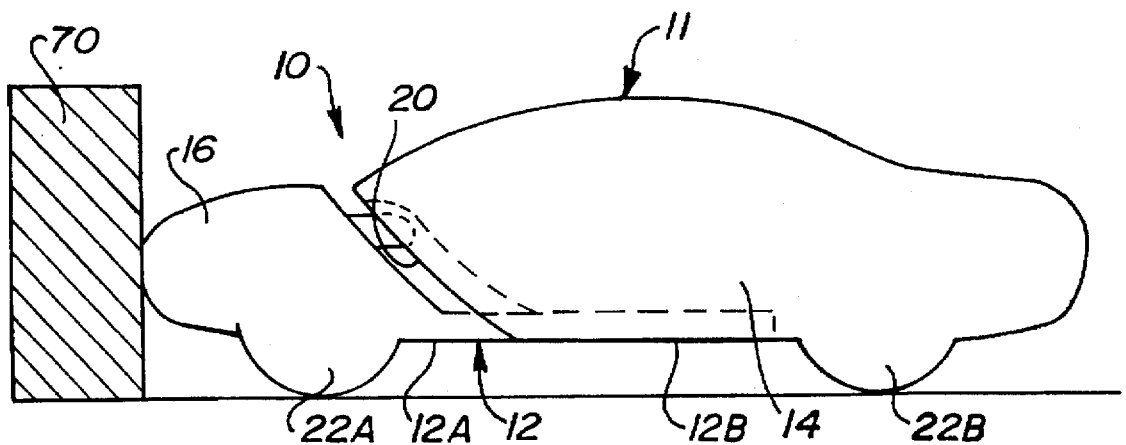
FIGS. 2A through 2C represent a series of diagrammatic side elevation views illustrating the safety vehicle of FIG. 1 as it impacts a stationary object.

In FIG. 2A, the safety vehicle 10 is illustrated as it initially encounters a stationary object such as a barrier or immovable wall 70. Upon initial impact, the forward portion 16 of the vehicle body 11 begins to crush. Provided that the collision occurs at a vehicle speed of approximately 30 miles per hour or greater, the front end, which is otherwise of conventional construction, is crushed, thereby absorbing energy of the impact. If the force transmitted to the front end of the vehicle is greater than the force required to completely crush the front end, the remaining force is transferred to the front chassis member 12a to fracture the shear bolts 50 which otherwise fixedly interconnect the front chassis member 12a with the rear chassis member 12b.

Figure 2B:
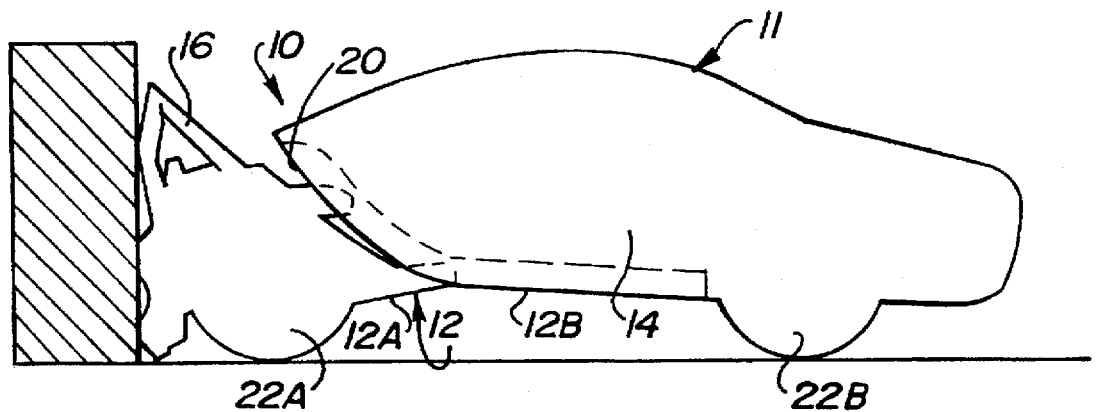
Figure 2C:
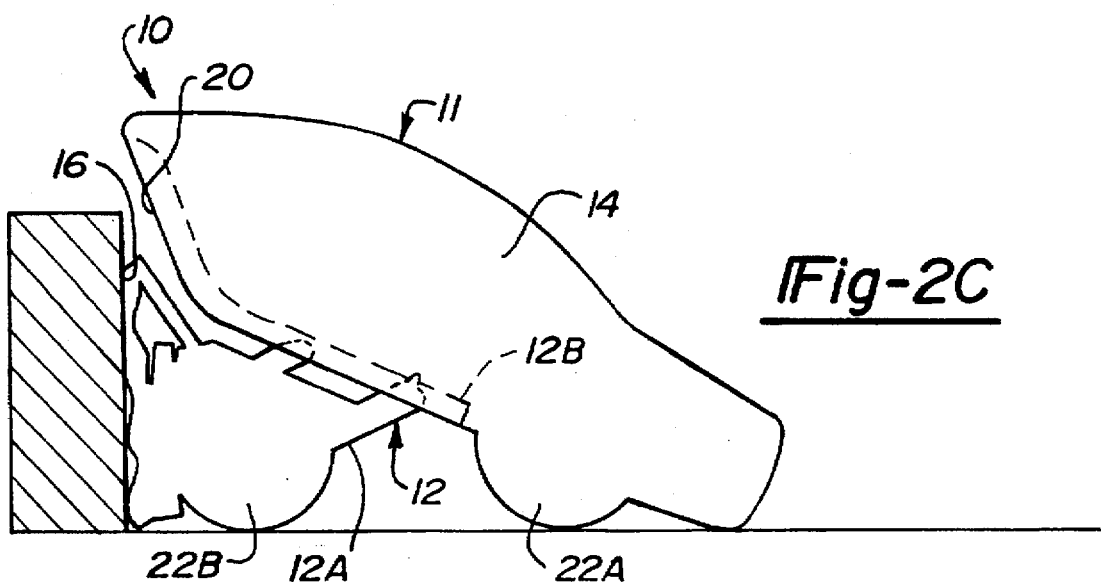

As shown in FIG. 2B, fracture of the shear bolts 50 allows the rear chassis member 12b to translate forwardly in a predetermined path relative to the front chassis member 12a. At this point in the collision, energy from the collision is absorbed through continual crush of the forward portion 16 of the vehicle body 11 and further through the shearing action of the upper end (shearing portion 54) of the second engagement portion 32 of the beam 24 as it encounters the web portion 56 of the first side 52 of the rear chassis member 12b. As shown in FIG. 2C, the configuration of the rear chassis member 12b upwardly displaces a forward portion of the occupant compartment 14 as the rear chassis member 12b continues forwardly relative to the front chassis member 12a.

With reference to the series of diagrammatic side elevational views of FIGS. 2A-2C, a typical collision involving the safety vehicle 10 and a stationary object such as a wall or the like will be described. FIG. 2A illustrates the safety vehicle 10 at the moment of impact with the stationary object. The wall is shown for illustrative purposes only, it being understood that the safety vehicle 10 is designed to protect passengers in any type of collisions, including for example, head-on automobile collisions.

Because the passenger 14 compartment is adapted to disconnect from the front chassis member 12a upon high speed impact, the deceleration of the passengers and absorption of kinetic energy required by the passenger compartment 14 and the passengers can be absorbed in a controlled path of travel and at significantly reduced deceleration rates. The maximum force imposed upon the passenger's body is therefore significantly reduced and the chances for survival substantially improve. Furthermore, as the forward end of the passenger compartment 14 is caused to be directed upwardly as well as longitudinally forwardly the passenger compartment 14 is tipped in a relation such that the passenger seats (not specifically shown) are tipped far back, thus the pressure imposed by forward movement of the passengers is directed towards and partially absorb by the seat cushions, thereby further reducing the chances of injury to the passengers.

Though the upward movement of the passenger compartment does absorb or convert the kinetic energy of the forward movement of the passenger compartment into work in elevating the compartment, the amount of energy so transformed is generally insufficient to adequately decelerate the passenger compartment at a safe rate. Therefore, the energy absorbing device is provided to absorb the remaining kinetic energy and reduce the velocity of the passenger compartment to zero.

Figure 6A:
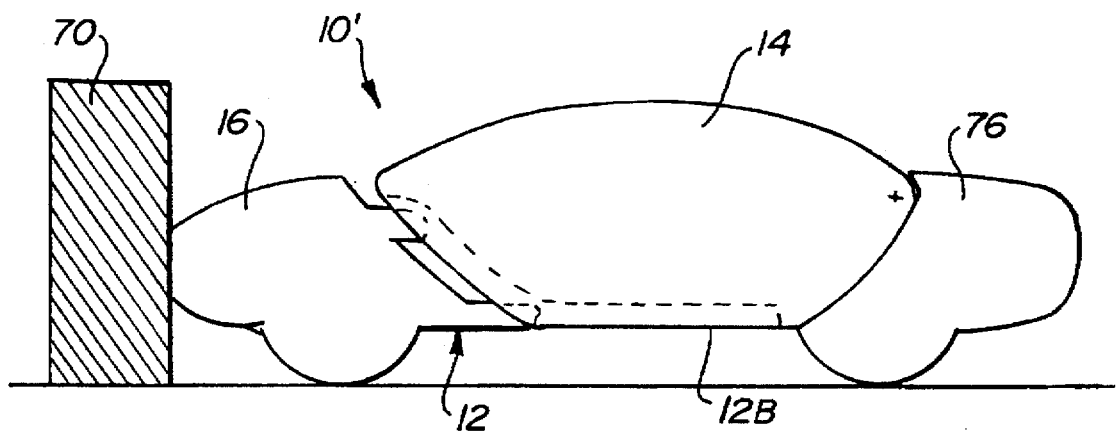
FIG. 6A and 6B represent two sequential diagrammatic side elevational views similar to FIGS. 2A and 2C, respectively, illustrating a safety vehicle constructed in accordance with the teachings of a second preferred embodiment as it impacts a stationary object.
Figure 6B:
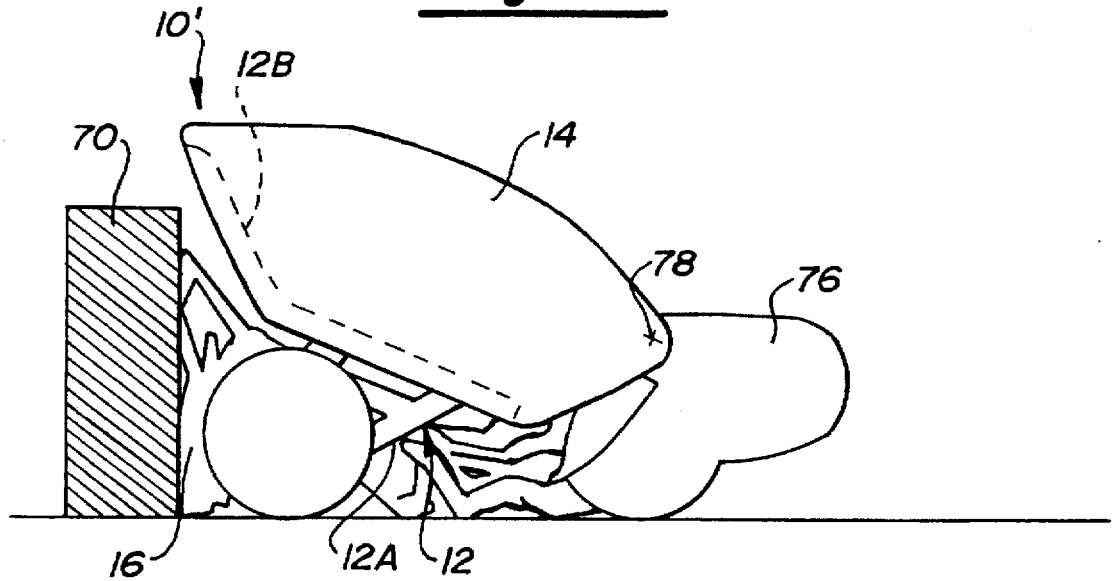

With reference to FIGS. 6A and 6B, two sequential diagrammatic side elevational views of a safety vehicle constructed in accordance with the teachings of a second preferred embodiment of the present invention are illustrated. The safety vehicle is generally identified with reference numeral 10'. Similar to FIG. 2A, FIGS. 6A illustrates the safety vehicle 10' at the moment of impact with a stationary object such as, for example, a wall 70. Again, wall 70 is shown for illustrative purposes only, it being understood that the safety vehicle 10' is adapted for protecting passengers in any type of collision, including, for example, head-on automobile collisions and other high speed impacts. FIGS. 6B illustrates the safety vehicle 10' after its motion has been arrested as a result of impact with the wall 112.

To a significant extent, the safety vehicle of this second preferred embodiment of the present invention 10' is similarly constructed to the safety vehicle of the first preferred embodiment 10. As a result, substantially identical elements which are common between the two embodiments 10 and 10' will be addressed in the second embodiment with reference numerals introduced with respect to the first embodiment 10. Thus, having previously described the common components during description of the first preferred embodiment 10, it will not be necessary to repeat such description. Most significantly, the safety vehicle 10' of the second preferred embodiment incorporates a passenger capsule 14 which is pivotal interconnected with a rear body portion 76. As a result, even less kinetic energy is necessary to arrest motion of the passenger capsule 14.

As impact between the safety vehicle 10' and the wall 70 continues, a rear portion of the passenger compartment 14 is pivotally interconnected to the rear body portion 76 for relative rotation about a pivot axis 78. Thus, as the forward portion of the passenger compartment 14 is displaced upwardly, the passenger compartment rotates clockwise as shown in FIG. 6B with respect to the rear body portion 76. As a result, a significant amount of mass is effectively disconnected from the passenger compartment 14, thereby decreasing the momentum of the passenger compartment 14 and decreasing the deceleration forces transferred to the vehicle occupant. It will be appreciated by those skilled in the art that the passenger compartment 14 and the rear body portion 76 can be connected in any suitable manner to effectively reduce the mass of the passenger compartment 14 during a collision.

Figure 7:
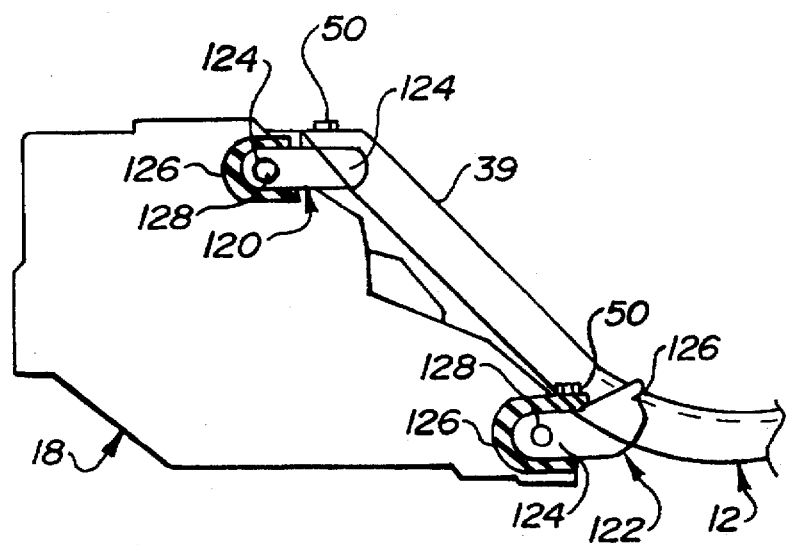
FIG. 7 is a side view which illustrates an alternative construction of the present invention in which the mounting portions are attached to the engine and are not directly interconnected to one another.

With reference to FIG. 7, a side view of an alternative construction of the safety vehicle 10 of the present invention is illustrated. With respect to features not illustrated in FIG. 7, the alternative construction is identical to the first embodiment described above. As a result, substantially identical elements common between the alternative construction and the first preferred embodiment will be identified with common reference numerals. In the alternative construction, the beam 24 has been replaced with an upper connecting member 120 and a lower connecting member 122. The upper and lower connecting members 120 and 122 include rearwardly projecting ends 124 and 126, respectively, which function identically to the first and second engagement portions 28 and 32, respectively, of the first embodiment. The upper and lower connecting members 120 and 122 further include forwardly projecting ends 124 interconnected to the engine 18 through engine mounts 126. In the embodiment illustrated, the forwardly projecting ends 124 are interconnected to the engine 18 with bolts 128.

While the above description constitutes three preferred embodiment of the invention, it will be appreciated that the invention is susceptible to modification, variation, and change without departing from the proper scope or fair meaning of the accompanying claims.

I claim:

1. In an automotive vehicle including a chassis, an engine and a body having a forward portion and a passenger compartment, the improvement comprising a safety arrangement including:

a chassis member fixedly attached to the passenger compartment;

a first connecting member interconnecting the engine and said chassis member, said first connecting member being slidingly engaged with said chassis member; and a securing element interconnecting said first connecting member and said chassis member, said securing element being adapted to fixedly retain said first connecting member relative to said chassis member under normal operating conditions of the automotive vehicle and further adapted to fail under a predetermined load so as to permit said chassis member to slide forwardly and upwardly relative to said first connecting member, a second connecting member slidingly engaged with said chassis member, said chassis member at least partially defining a channel for telescopically receiving a portion of each of said first and second connecting members.

2. The safety arrangement for an automotive vehicle of claim 1, wherein said chassis member includes a first side defining a longitudinal extending series of alternating webs and slots.

3. The safety arrangement for an automotive vehicle of claim 2, wherein said first connecting member includes a shearing portion partially extending beyond said channel, said shearing portion being adapted to shear said webs of said series of webs and slots as an impact force rearwardly displaces said rear chassis member relative to said first connecting member.

4. The safety arrangement for an automotive vehicle of claim 1, wherein said chassis member includes an upwardly extending forward section arranged such that said passenger compartment is upwardly displaced as said chassis member is moved forwardly relative to said first connecting member.

5. The safety arrangement for an automotive vehicle of claim 1, wherein said securing element comprises a shear bolt.

6. An automotive vehicle comprising:
a body having a passenger compartment and a forward portion;
a chassis including a rear chassis member and a forward chassis member, said rear chassis member being fixedly attached to said passenger compartment, said forward chassis member fixedly attached to the forward portion of the body, said forward chassis member being slidingly engaged with said rear chassis member;
an engine fixedly attached to said forward chassis member; and
a plurality of securing elements interconnecting said forward chassis member and said rear chassis member, said plurality of securing elements being adapted to fixedly retain said forward chassis member relative to said rear chassis member under normal operating conditions of the automotive vehicle and further adapted to fail under a predetermined load so as to permit said rear chassis member to slide forwardly relative to said forward chassis member, wherein said rear chassis member at least partially defines a channel for telescopically receiving a first end of said forward chassis member.

7. The automotive vehicle of claim 6, wherein said forward chassis member includes first and second engagement portions in sliding engagement with said rear chassis member.

8. The automotive vehicle of claim 6, wherein said rear chassis member includes a first side defining a longitudinal extending series of alternating webs and slots.

9. The automotive vehicle of claim 8, wherein said forward chassis member includes a shearing portion partially extending beyond said channel, said shearing portion being adapted to shear said webs of said series of webs and slots as an impact force forwardly displaces said rear chassis member relative to said forward chassis member.

10. The automotive vehicle of claim 9, wherein said rear chassis member includes an upwardly extending forward section arranged such that said passenger compartment is upwardly displaced as said rear chassis member is moved forwardly relative to said forward chassis member.

11. The automotive vehicle of claim 10, further comprising a retaining member attached to said forward chassis member, said retaining member being operative to retain said forward chassis member telescopically within said rear chassis member as said rear chassis member is forwardly moved relative to said forward chassis member.

12. The automotive vehicle of claim 7, wherein said plurality of securing elements comprise a plurality of shear bolts.

13. An automotive vehicle of the type including an engine for absorbing deceleration forces generated from high speed head-on collisions or impacts and upwardly displacing a vehicle occupant relative to said engine, the automotive vehicle comprising:
a rear chassis member fixedly attached to the passenger compartment;
a forward chassis member fixedly attached to the forward portion of the body, said forward chassis member being slidingly engaged with said rear chassis member; and
said rear chassis member being configured so as to upwardly displace said passenger compartment when said rear chassis member is translated forwardly relative to said forward chassis member;
a plurality of securing elements interconnecting said forward chassis member and said rear chassis member, said plurality of securing elements being adapted to fixedly retain said forward chassis member relative to said rear chassis member under normal operating conditions of the automotive vehicle and further adapted to fail under a predetermined load so as to permit said rear chassis member to slide forwardly relative to said forward chassis member;
a shearable section carried by one of said forward chassis member and said rear chassis member; and
a shearing portion carried by the other of said forward chassis member and said rear chassis member;
wherein said one of said forward chassis member and said rear chassis member includes a first side defining a series of longitudinally extending alternating slots and webs, each web of said alternating slots and webs being shearable under a predetermined load;
whereby the distance within which motion of an occupant is arrested relative to said vehicle body during a high speed head-on collision or impact is lengthened, thereby decreasing the magnitude of the potentially injurious deceleration forces transferred from said vehicle body to the occupant.

14. The automotive vehicle for absorbing energy and effectively lengthening the distance within which motion of an occupant is arrested of claim 13, wherein said forward chassis member includes first and second engagement portions in sliding engagement with said rear chassis member.

15. The automotive vehicle for absorbing energy and effectively lengthening the distance within which motion of an occupant is arrested of claim 13, wherein said rear chassis member includes an upwardly extending forward section arranged such that said passenger compartment is upwardly displaced as said rear chassis member is moved forwardly relative to said forward chassis member.

16. The automotive vehicle for absorbing energy and effectively lengthening the distance within which motion of an occupant is arrested of claim 13 wherein said plurality of securing elements comprise a plurality of shear bolts.

* * * * *